United States Patent [19]

Duroyon et al.

[11] Patent Number: 4,590,830
[45] Date of Patent: May 27, 1986

[54] METHOD AND APPARATUS FOR CONTROLLING CASING HOLDBACK

[75] Inventors: Hervé D. Duroyon, Beauvais; Jean-Michel M. Sene, Warluis, both of France

[73] Assignee: Union Carbide Corporation, Danbury, Conn.

[21] Appl. No.: 583,313

[22] Filed: Feb. 24, 1984

[51] Int. Cl.⁴ .............................................. A22C 11/02
[52] U.S. Cl. .......................................... 17/49; 17/35; 17/33
[58] Field of Search ...................... 17/33–35, 17/41, 42, 49; 53/576

[56] References Cited

U.S. PATENT DOCUMENTS

| | | | |
|---|---|---|---|
| 1,876,279 | 9/1932 | Dietrich | 17/42 |
| 2,477,587 | 8/1949 | Doutt | 83/530 |
| 3,140,509 | 7/1964 | Muller | 17/33 |
| 3,457,588 | 7/1969 | Myles et al. | 17/35 X |
| 3,748,690 | 7/1973 | Niedecker | 17/33 |
| 3,751,764 | 8/1973 | Dobbert | 17/35 |
| 3,872,543 | 3/1975 | Niedecker | 17/33 |
| 4,044,425 | 8/1977 | Nausedas | 17/35 |
| 4,077,090 | 3/1978 | Frey et al. | 17/41 |
| 4,164,057 | 8/1979 | Frey et al. | 17/49 |
| 4,257,146 | 3/1981 | Karp | 17/35 |

Primary Examiner—James M. Meister
Attorney, Agent, or Firm—Roger Aceto

[57] ABSTRACT

In a casing machine, a length adjustable tubular member for adjusting casing holdback force contacts about the outer surface of the casing. The length of the tubular member is adjustable to position a pressure ring on one end of the tubular member closer to or farther from a sizing member which contacts the inner surface of the casing whereby the distance between the pressure ring and sizing member establishes the magnitude of the casing holdback force.

16 Claims, 2 Drawing Figures

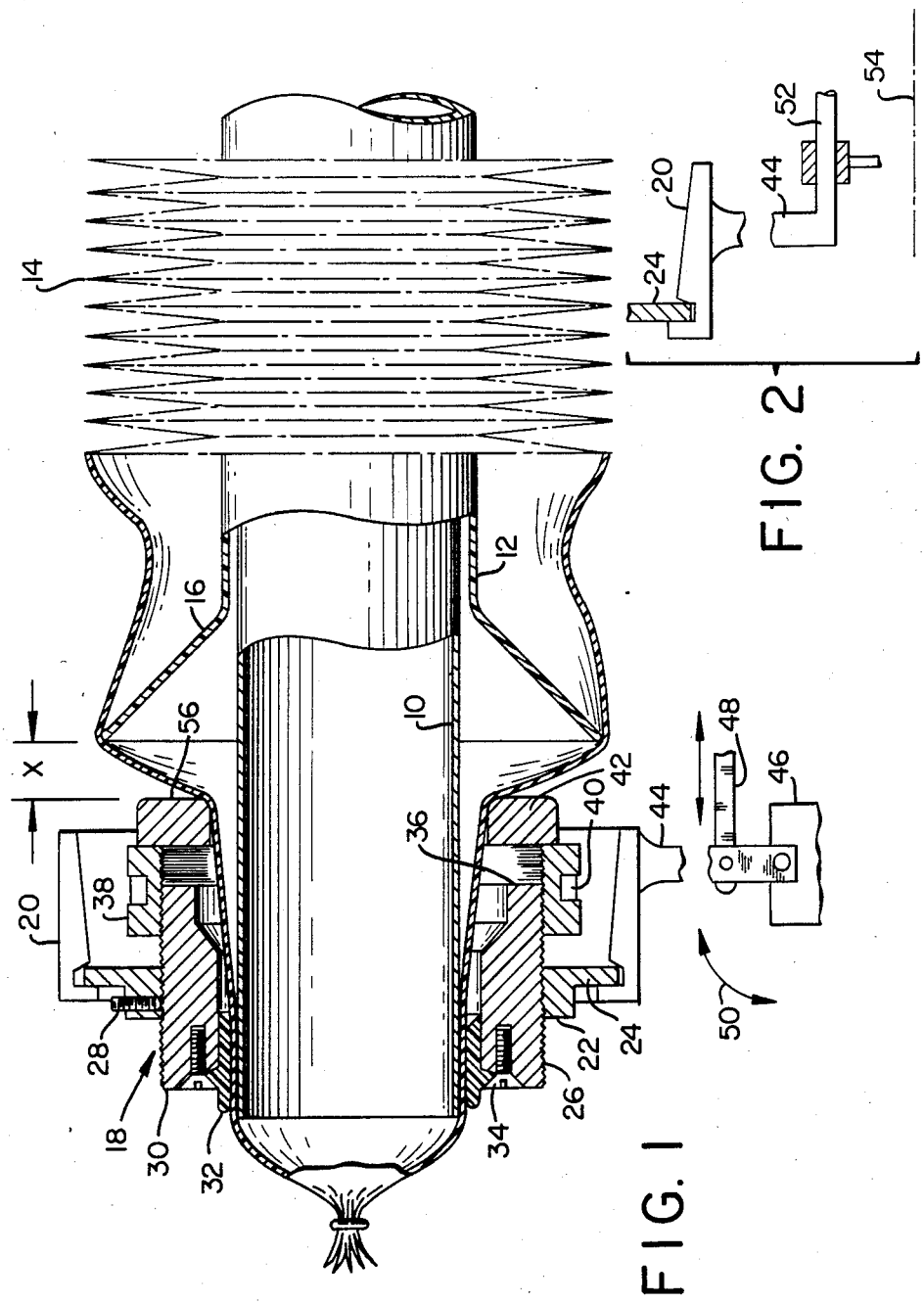

METHOD AND APPARATUS FOR CONTROLLING CASING HOLDBACK

BACKGROUND

The present invention relates to a stuffing apparatus and method and more particularly to means and method for making fine adjustments to casing holdback.

Casing holdback is one factor which should be controlled in order to stuff a casing to a desired diameter. In general terms, the casing will be more fully stuffed as casing holdback increases. Since casings of the same size may not necessarily exhibit similar stuffing characteristics, an adjustable holdback force is desired so that small changes can be made to insure that the casing is stuffed out to a given diameter.

In some automatic operations there is even provision for applying and releasing a holdback force at selected times in the sutffing cycle. For example, holdback force is applied to the casing during stuffing and then is released in order to facilitate the gathering and closing of the casing over the trailing end of the stuffed product. In these automatic operations control of the limits of the holdback force is desirable to insure that when the holdback force is applied, it is not more or less than the desired amount.

The present invention provides a means to quickly and easily accomplish small adjustments to the holdback force. In particular the present invention is adapted to make such an adjustment in stuffing apparatus wherein the holdback force is provided by cooperation of a sizing member within the casing and an external casing contacting member outside the casing.

Typically, such apparatus, as shown for example in U.S. Pat. Nos. 4,007,090 and 4,164,057, has a sizing member within the casing which contacts the inner surface of the casing as the casing is drawn over the sizing member. An external casing contacting member, usually a snubbing ring which is placed about the exterior of the casing, turns the casing inwardly as it is drawn over the internal sizing member. The axial or longitudinal distance between the snubbing ring and sizing member contributes to the magnitude of the total casing holdback force. In the method and apparatus of the present invention, provision is made for fine adjustment of the closest spacing of the internal and external casing contacting members to control the magnitude of the casing holdback force.

In stuffing apparatus, there also is usually an emulsion seal which snugs the casing to the stuffing horn adjacent to the discharge of the stuffing horn. This seal prevents the product being stuffed from backflowing around the end of the stuffing horn. The present invention permits incorporation of such an emulsion seal into a common fixture with the external casing contacting member. Even though the external casing contacting member and emulsion seal are on a common fixture, the present invention, nevertheless allows movement of the external casing contacting member relative to the emulsion seal so that any adjustment of the casing contacting member will not disrupt the location of the emulsion seal from its position at the discharge end of the stuffing horn. Conversely, in the present invention, the emulsion seal can be located at a desired position relative to the discharge end of the stuffing horn and the external casing contacting member can be adjusted without changing the emulsion seal position.

SUMMARY OF THE INVENTION

The apparatus of the present invention can be characterized in one aspect thereof by the provision of a stuffing horn adapted to receive a casing supply, and a sizing member disposed within the casing for contacting the inner surface of the casing. An engaging means surrounds the discharge end of the stuffing horn, the engaging means having a first end located adjacent the discharge of the stuffing horn and a second end located adjacent the sizing member. The second end of the engaging means includes an external casing contacting member which contacts the outer surface of the casing to direct the casing inward and through the engaging means as the casing is drawn over the sizing member. A seal means is on the first end of the engaging means for snugging the casing to the outer surface of the stuffing horn adjacent the discharge end of the stuffing horn. The engaging means is longitudinally expandable for increasing or decreasing the axial distance between the first and second ends so that the external casing contacting member can be moved with respect to the seal means without altering the relative position of the seal means.

In its method aspect the present invention may be characterized by the steps of mounting a casing supply and a sizing member to a stuffing horn, the sizing member contacting the inner surface of the casing; placing an engaging means including an external casing contacting member about the exterior of the casing for turning the casing inwardly as it passes over the sizing member and for directing the casing through the engaging means; adjusting the length of the engaging means to position the external casing contacting member at a selected distance from the sizing member and thereafter stuffing the casing.

DESCRIPTION OF THE DRAWINGS

FIG. 1 is a longitudinal section of the stuffing horn including the length adjustable engaging means of the present invention; and FIG. 2 shows a modified version of a part of the mechanism shown in FIG. 1.

DESCRIPTION OF THE PREFERRED EMBODIMENT

Referring to the drawings, FIG. 1 shows a stuffing horn 10. Mounted to the stuffing horn is a tubular sleeve 12 which carries a supply of shirred casing 14. The forward end of the sleeve is outwardly flared to provide a sizing member 16. The outer circumference of the sizing member contacts the inner surface of the casing as the casing is drawn over the sizing member. The rearward end (not shown) of the tubular sleeve can be attached to the stuffing horn by any suitable clamp or other connector means to fix the sleeve with respect to the stuffing horn. In other applications of the invention, the sleeve 12 could be fixed, to a slacker mechanism or similar device which would allow the sleeve 12 to move longitudinally along the stuffing horn.

The engaging means which surrounds the stuffing horn and which incorporates the adjustable feature of the present invention is generally indicated at 18. The adjustable engaging means 18 surrounds the discharge of the stuffing horn and contacts the outer surface of the casing for folding the casing inwardly towards the horn as the casing is drawn around and over the sizing member 16. Engaging means 18 is connected to a mounting member 20 as further described hereinbelow. Mounting number 20 and its operation are generally conventional. Accordingly it will be described only to the extent necessary to permit an understanding of the adjustable engaging means 18 of the present invention.

Engaging means 18 includes a ring holder 22. This ring holder is internally threaded and has an outwardly extending flange 24 which is captured by mounting member 20.

Threaded to ring holder 22 is an inner ring 26. The inner ring has external threads which extend over the full length of the inner ring so that this ring can be adjusted longitudinally with respect to ring holder 22. Once the inner ring is set at the desired position with respect to the ring holder, a screw or other appropriate means 28 is tightened to insure that the ring holder and inner ring remain in the adjusted position.

The fore end 30 of the inner ring carries a seal 32, accordingly, the adjustment of inner ring 26 with respect to ring holder 22 sets the position of seal 32 relative to the stuffing horn. This seal can be a part of the inner ring or can it be a replaceable element as shown, whereby the seal 32 is releasably attached to the inner ring by any suitable means, as for example, by screws 34. Seal 32 acts to snug the casing to the outer surface of the stuffing horn to prevent any product from backflowing around the discharge of the stuffing horn. While seal ring 32 is shown as being located at the discharge of the stuffing horn, it is understood that for any given stuffing operation, it may be desirable to position the seal ring farther to the right as viewed in FIG. 1.

Threaded to the aft end 36 of inner ring 26 is an adjusting ring 38. Adjusting ring 38 in effect defines the extent of aft end 36 in that turning the adjusting ring in one direction or the other will operate to increase or decrease the overall length of inner ring 26. The adjusting ring may be provided with spanner wrench openings 40 to facilitate the turning of the adjusting ring.

Positioned against adjustment ring 38 but not fixed to the adjustment ring, is a pressure ring 42. This pressure ring has a rounded surface 56 to facilitate infolding of the casing through engaging means 18. This pressure ring 42 is shown in an operative position in FIG. 1, wherein the forward movement of the casing during a stuffing operation causes the pressure ring to move against the adjusting ring. When the casing is not in the position as shown, the pressure ring is free to move radially or longitudinally with respect to the stuffing horn.

The limit to the movement of the pressure ring 42 towards the fore end 30 of inner ring 26, or to the left as viewed in FIG. 1, is determined by the position of adjustment ring 38. The adjustment ring also defines in part, the distance of the pressure ring 42 from sizing member 16. This distance as indicated at X in FIG. 1, can be increased or decreased by turning the adjustment ring in one direction or the other.

The attachment of engaging means 18 and mounting member 20 to the stuffing machine can be accomplished in any one of several ways. One means for attaching the mounting member to the stuffing machine, as illustrated in FIG. 1, includes a support arm 44 which is pivoted to an element 46 of the machine frame. Any suitable means such as a pneumatic piston rod 48 is selectively operated to pivot mounting member 20 and engaging means 18 in the direction as indicated by arrow 50.

In another embodiment, as shown in FIG. 2, support arm 44 can be attached to a reciprocating number 52 so that the mounting member and engaging means 18 can move longitudinally with respect to the stuffing horn. In addition to this longitudinal movement, the support arm 44 can be made to pivoted about an axis 54 which is parallel to the axis of the stuffing horn so that the mounting member 20 and engaging means 18 are pivoted in a plane perpendicular to the stuffing horn axis.

With reference to FIG. 1 the operation of the device will be described as beginning with support arm 44 pivoted to a counterclockwise position so that the engaging means 18 is clear of the stuffing horn. In this position sleeve 12 with its supply of casing 14 is placed over the stuffing horn and attached thereto by any suitable means not shown. The point of attachment is generally predetermined so that sizing member 16 will be at approximately the desired position with respect to the discharge of the stuffing horn.

Pressure ring 42 is slipped over the stuffing horn and casing. After the pressure ring is put in place, support arm 44 is pivoted clockwise to carry the engaging means over the discharge of the stuffing horn to the position shown in FIG. 1.

It should be appreciated that when stuffing is commenced, the casing will be drawn over sizing member 16 and will pass inwardly through pressure ring 42. The passage of the casing in this manner will center the pressure ring about the stuffing horn and will move the pressure ring forward until it abuts against adjusting ring 38. This abutment establishes the distance X between sizing member 16 and pressure ring 42 which, in turn, determines the holdback force on the casing.

Prior to beginning the stuffing operation, adjusting ring 38 is adjusted with respect to inner ring 26 to insure that during stuffing, pressure ring 42 will be in its proper position with respect to sizing member 16. As set out hereinabove, rotating adjusting ring 38 will increase or decrease the overall length of the inner ring 26 so that the pressure ring 42 will be positioned closer to, or farther away from, the sizing member 16 without altering the relative position the seal 32.

In the arrangement as shown in FIG. 2, operation is similar except that the mounting member 20 and engaging means 18 are first moved longitudinally, to the left, until adjustment ring 38 (FIG. 1) is clear of the end of the stuffing horn. After reaching this position, the engaging means can be pivoted about axis 54 to move it away from the stuffing horn. This enables the operator to load a sleeve 12 and casing supply 14 on to the stuffing horn, or to enable the operator to remove an empty sleeve 12 from the stuffing horn after the casing on the sleeve has been expended in the stuffing operation. FIG. 2 also illustrates an arrangement which can apply or release the casing holdback force by moving the mounting member 20, and therefore the engaging means 18 (including pressure ring 42) as carried by the mounting member, towards and away from the inner sizing member 16 (FIG. 1).

The engaging means as shown can be used to accommodate stuffing horns of different diameters by changing seal member 32. As shown in FIG. 1, the engaging means 18 is set up to accommodate the largest diameter of stuffing horn. To accomodate a stuffing horn which is smaller in diameter than the one shown, seal member 32 is removed and replaced by one having a smaller inside diameter so that it snugs the casing to the outside diameter of the smaller stuffing horn. In like respect, pressure ring 42 can be replaced by one having a smaller inside diameter to accommodate the smaller diameter casing which must be turned inwardly towards the stuffing horn.

While adjusting ring 38 and pressure ring 42 are described as separate elements, it may be possible in certain applications to combine these into a single element. In this respect the pressure ring 42 will constitute an end of the adjustment ring 38.

Having thus described the invention in detail what is claimed as new is:

1. In a stuffing apparatus including a stuffing horn on which is mountable both a shirred casing supply and a sizing member which is disposable within a mounted casing and in contact with the inner surface of an unshirred portion of the casing, a mounting member adjacent the discharge of the stuffing horn and an engaging means carried by the mounting member and surrounding the stuffing horn for contacting the outer surface of unshirred casing to fold casing inwardly and through the engaging means as it is drawn over the sizing member, said engaging means being longitudinally adjustable with respect to said mounting member and comprising:
   (a) an inner ring (26) fixed to said mounting member (20) and longitudinally adjustable with respect to said mounting member, and said inner ring having a first end 30 adjacent said stuffing horn discharge and a second end 36 adjacent said sizing member;
   (b) seal means (32) on said first end (30) to snug unshirred unfolded casing to the outer surface of the stuffing horn; and
   (c) adjustable means (38) carried at said second end (36), said adjustable means being longitudinally adjustable with respect to said inner ring towards and away from said sizing member.

2. A stuffing apparatus as in claim 1 wherein said adjustable means has an external casing contacting surface (56).

3. A stuffing apparatus as in claim 1 wherein said seal means comprises a seal ring (32) releasably fixed to said first end (30).

4. A stuffing apparatus as in claim 1 wherein said adjustable means includes a threaded adjustment ring (38) in screw engagement with said inner ring whereby rotating said adjustment ring moves it longitudinally with respect to said inner ring.

5. A stuffing apparatus as in claim 4 wherein said external casing contacting member is a pressure ring (42) positioned adjacent said adjustment ring and about said stuffing horn, said pressure ring being free to move radially with respect to said stuffing horn and longitudinally between said adjustment ring and said sizing member.

6. A stuffing apparatus as in claim 5 wherein said pressure ring has a rounded, casing contacting surface (56) to facilitate infolding of the casing.

7. A stuffing apparatus as in claim 1 wherein the mounting member is longitudinally adjustable with respect to the stuffing horn wherein movement in one direction carries said engaging means closer to said sizing member for increasing casing holdback force, and movement in an opposite direction increases the distance between said engaging means and sizing member to decrease casing holdback force.

8. A stuffing apparatus comprising:
   (a) a stuffing horn (10) having a discharge end;
   (b) a casing sizing member (16) on said stuffing horn and disposable within a casing to be stuffed for contacting against the inner surface of the casing during stuffing;
   (c) casing engaging means (18) surrounding said stuffing horn, said engaging means including a first end (30) located adjacent said discharge end and a longitudinally spaced second end (36, 38) located adjacent said sizing member;
   (d) a ring (42) at said second end for contacting about the outer surface of the casing to direct the casing inward and through said casing engaging means as the casing is drawn over said casing sizing member during stuffing, said ring being freely movable in a radial direction with respect to said stuffing horn for centering about said stuffing horn;
   (e) seal means (32) on said first end for snugging the casing to the outer surface of said stuffing horn as the casing passes through said engaging means; and
   (f) said casing engaging means including a longitudinally adjustable means (38) contacting against said ring (42) for increasing or decreasing the longitudinal spacing between said first end and said ring to adjust the position of said ring (42) with respect to said casing sizing member (16).

9. A stuffing apparatus as in claim 8 wherein said ring (42) is free from said second end (36, 38) and is movable longitudinally between said second end and said sizing member responsive to forces exerted on said ring by said second end and by the casing which is in contact with said pressure ring.

10. A stuffing apparatus comprising:
    (a) a stuffing horn (10) having a discharge end;
    (b) a casing sizing means (16) on the stuffing horn and disposable within a casing to be stuffed for contacting against the inner surface of the casing during stuffing;
    (c) a tubular ring (26) surrounding said stuffing horn, said tubular ring having a first end (30) located adjacent said stuffing horn discharge end and a longitudinally spaced second end (36, 38) located adjacent said sizing means;
    (d) external casing contacting means (42) at said tubular ring second end for contacting against the outer surface of the casing to direct the casing inward and through said tubular ring as the casing is drawn over said sizing member during stuffing;
    (e) seal means (32) on said tubular ring first end for snugging the casing to the outer surface of said stuffing horn as the casing passes through said tubular ring; and
    (f) an adjusting ring threaded to the exterior of said tubular ring and turnable about the longitudinal axis of said tubular ring for increasing or decreasing the longitudinal distance between said first and second ends and adjusting the position of said external casing contacting means (42) relative to said casing sizing means (16).

11. A stuffing apparatus as in claim 10 wherein said casing contacting means is a pressure ring (42) disposed against said adjusting ring (38).

12. A stuffing apparatus as in claim 11 wherein said pressure ring (42) has an inside diameter greater than the outside diameter of said stuffing horn and is radially movable for centering about said stuffing horn as casing moves between said pressure ring and stuffing horn.

13. A casing engaging means attachable to a longitudinally movable mounting member of a stuffing apparatus for disposition about the stuffing horn of the apparatus between the stuffing horn discharge end and a casing sizing means on the stuffing horn, said casing engaging means comprising;

(a) a tubular ring (26) carried by the mounting member and surrounding the stuffing horn said tubular ring having a first end (30) located adjacent the stuffing horn discharge end and a second end (36) located between the stuffing horn discharge end and the casing sizing means;

(b) said tubular ring being longitudinally adjustable with respect to the mounting member and stuffing horn for locating said first end at an adjusted position with respect to the stuffing horn discharge end;

(c) an external casing contacting means (42) at said second end for contacting the outer surface of casing passing over the sizing means and directing the casing inwardly through said tubular ring;

(d) seal means (32) on said first end (30) for snugging the casing passing through said ring to the outer surface of the stuffing horn; and (e) adjusting means (38) on said tubular ring and engagable with said external casing contacting means for adjusting the longitudinal distance between said external casing contacting member and said seal means while maintaining the adjusted position of said first end with respect to said stuffing horn discharge end.

14. A casing engaging means as in claim 13 wherein the mounting member (20) of the stuffing apparatus includes a ring holder (22) having internal threads and said positioning means comprises external threads on said tubular ring (26) adapted to threadable mate with internal threads on said ring holder.

15. A stuffing apparatus including a stuffing horn on which is mountable both a casing supply and a casing sizing member for contacting against the inner peripheral surface of the casing as it is drawn over the sizing member during stuffing, and further including means for establishing a limit to the holdback force on the casing comprising:

(a) mounting means movable longitudinally of the stuffing horn;

(b) a tubular ring carried by said mounting means and positionable about the stuffing horn between the discharge end of the stuffing horn and the casing sizing member with one end of the tubular ring located adjacent the stuffing horn discharge and a second end located adjacent said casing sizing member;

(c) means for adjusting said tubular ring with respect to said mounting means and along the longitudinal axis of the stuffing horn towards and away from the casing sizing member to locate said one end at an adjusted position relative to the discharge end of the stuffing horn;

(d) casing contacting means at said second end for contacting about the outer peripheral surface of the casing and directing the casing inwardly through the tubular ring as the casing passes over the casing sizing member, said casing contacting means being movable together with said tubular ring towards and away from the casing sizing member wherein movement towards the casing sizing member increases casing holdback and movement away decreases casing holdback; and (e) adjustable means carried by said tubular ring and cooperatively associated with said casing contacting means for adjustable movement with respect to said tubular ring along the longitudinal axis thereof to locate said casing contacting means at an adjusted longitudinal position relative to said tubular ring and said adjustable means maintaining its adjusted position and the position of said casing contacting means relative to said tubular ring as said tubular ring moves towards and away from said casing sizing member.

16. A stuffing method comprising the steps of:

(a) mounting to a stuffing horn, a casing supply and a casing sizing means;

(b) locating about the stuffing horn a tubular member which has one end adjacent the discharge end of the stuffing horn and which has at its second end adjacent the casing sizing means, a ring for contacting against the exterior peripheral surface of the casing;

(c) passing the casing over the casing sizing means and contacting the sizing means against the inner peripheral surface of the casing, and then passing the casing through the ring and tubular member wherein the sequence of casing interior and casing exterior contact creates a holdback force on the casing during stuffing;

(d) longitudinally adjusting the location of said tubular member to position said one end relative to the discharge end of the stuffing horn;

(e) while holding the relative position of said one end, moving said ring parallel with respect to the longitudinal axis of the tubular member to selectively increase or decrease the distance between said ring and said casing sizing means; and (f) while maintaining the position of said ring relative to said tubular member, moving said tubular member longitudinally towards and away from said casing sizing means at defined times during a stuffing cycle to increase and decrease, respectively, the holdback force on the casing.

* * * * *

UNITED STATES PATENT AND TRADEMARK OFFICE
CERTIFICATE OF CORRECTION

PATENT NO. : 4,590,830
DATED : May 27, 1986
INVENTOR(S) : Herve Daniel Duroyon/Jean-Michel Maurice Sene It is certified that error appears in the above—identified patent and that said Letters Patent is hereby corrected as shown below:

Column 3, line 22 after "or" insert --it--; after "can", omit --it--.

Column 3, line 64 "pheumatic" should read --pneumatic--.

Column 3, line 66 "number" should read --member--.

Column 4, line 4 "pivoted" should read --pivot--.

Column 4, line 40 after "position" insert --of--.

Signed and Sealed this

Twenty-first Day of April, 1987

Attest:

DONALD J. QUIGG

Attesting Officer

Commissioner of Patents and Trademarks